United States Patent [19]

Belanger et al.

[11] Patent Number: 4,817,301

[45] Date of Patent: Apr. 4, 1989

[54] APPARATUS FOR DRYING VEHICLES

[75] Inventors: James A. Belanger; Robert J. Wentworth, both of Northville; Graham J. Astley, Novi; Barry S. Turner, Livonia, all of Mich.

[73] Assignee: Belanger, Inc., Northville, Mich.

[21] Appl. No.: 55,581

[22] Filed: May 27, 1987

[51] Int. Cl.[4] .......................................... F26B 19/00
[52] U.S. Cl. ....................................... 34/243 C; 34/233
[58] Field of Search ................... 34/243 C, 225, 232, 34/233

[56] References Cited

U.S. PATENT DOCUMENTS

| | | | |
|---|---|---|---|
| 2,083,634 | 6/1937 | Brackett | 91/45 |
| 2,132,303 | 10/1938 | Lathrop | 34/12 |
| 2,321,983 | 6/1943 | Brackett | 91/45 |
| 2,440,157 | 4/1948 | Rousseau | 34/229 |
| 2,448,834 | 9/1948 | Rousseau | 34/243 |
| 2,788,009 | 4/1957 | Lones | 134/102 |
| 2,830,311 | 4/1958 | Vizdos | 15/21 |
| 2,941,221 | 6/1960 | Smith | 15/21 |
| 2,949,678 | 8/1960 | Anderson | 34/105 |
| 3,224,108 | 12/1965 | Flaming | 34/87 |
| 3,255,037 | 6/1966 | Knight et al. | 117/105.3 |
| 3,279,093 | 10/1966 | Dutton | 34/229 |
| 3,307,223 | 6/1962 | Lovsey | 15/21 |
| 3,336,622 | 8/1967 | Kullwitz | 15/302 |
| 3,367,040 | 2/1968 | Vani | 34/54 |
| 3,375,592 | 4/1968 | Heinicke | 34/87 |
| 3,410,284 | 11/1968 | Burger | 134/57 |
| 3,442,027 | 5/1969 | Hurwitz | 34/54 |
| 3,451,094 | 6/1969 | Kywi | 15/302 |
| 3,497,895 | 3/1970 | Oldham et al. | 15/21 |
| 3,533,422 | 10/1970 | Alimanestiano | 134/45 |
| 3,570,042 | 3/1971 | Solomon | 34/243 C |
| 3,583,686 | 6/1971 | Mackey | 34/243 C |
| 3,590,417 | 7/1971 | Emanuel | 15/302 |
| 3,705,435 | 12/1972 | Von Kulmer | 15/21 R |
| 3,742,615 | 7/1973 | Capra | 34/229 |
| 3,765,104 | 10/1973 | Takeuchi | 34/229 |
| 3,780,448 | 12/1973 | Von Kulmer | 34/229 |
| 3,803,727 | 4/1974 | Takeuchi | 34/229 |
| 3,805,410 | 4/1974 | Rupp | 34/225 |
| 3,806,985 | 4/1974 | Takeuchi | 15/307 |
| 3,808,698 | 5/1974 | Peters | 34/33 |
| 3,808,703 | 5/1974 | Kamiya | 34/243 C |
| 3,877,107 | 4/1975 | Cirino | 15/302 |
| 3,918,171 | 11/1975 | Hull | 34/243 C |
| 4,278,046 | 7/1981 | Clarke et al. | 118/695 |
| 4,369,541 | 1/1983 | Belanger et al. | 15/97 B |
| 4,472,889 | 9/1984 | Hanna | 34/229 |
| 4,563,788 | 1/1986 | Kobayashi | 34/243 L |
| 4,587,688 | 5/1986 | Gougoulas | 15/316 R |
| 4,589,160 | 5/1986 | Day et al. | 34/243 C |
| 4,651,442 | 3/1987 | McIntyre | 34/243 C |

FOREIGN PATENT DOCUMENTS

| | | |
|---|---|---|
| 59-134033 | 8/1984 | Japan . |
| 59-151156 | 8/1985 | Japan . |
| 60-176852 | 9/1985 | Japan . |
| 60-176853 | 9/1985 | Japan . |
| 60-176854 | 9/1985 | Japan . |

OTHER PUBLICATIONS

"IBM Technical Disclosure Bulletin", vol. 18, No. 8, pp. 2665, 2667, Jan. 1976, By: Affinito, Wang & Yee.

Primary Examiner—Henry A. Bennet
Attorney, Agent, or Firm—Cullen, Sloman, Cantor, Graner, Scott & Rutherford

[57] ABSTRACT

In an apparatus for drying vehicles having a framework upon a floor surface adapted to receive a moving vehicle, a transverse lift rod is guidably mounted upon the framework for controlled vertical adjustments and mounts a transverse top nozzle housing having an inlet, an air chamber and laterally diverging sidewalls terminating in an elongated throated air outlet. A pair of opposed upright side nozzle housings are mounted upon opposite sides of the framework with each housing having an inlet, an elongated air chamber, and an elongated lateral nozzle inclined rearwardly at an acute angle toward the vehicle. A plurality of motor-operated air blowers are mounted upon the framework with each blower having an air outlet, with a plurality of flexible hoses interconnecting the outlet of each blower with one of the housing inlets. A remote-controlled power device is connected to the lift rod for successively raising and lowering the top nozzle housing to prevent any contact with a vehicle moving through the framework.

55 Claims, 7 Drawing Sheets

APPARATUS FOR DRYING VEHICLES

FIELD OF THE INVENTION

The present invention relates to an apparatus or dryer for drying vehicles having a framework adapted to receive a moving vehicle, and more particularly to one or more top air nozzles and a pair of opposed side air nozzles mounted upon the framework, with separate air blowers upon the framework having outlets, and individual hoses between each blower outlet and nozzle together with automatic mechanisms to prevent contact of any nozzle with the vehicle passing through the framework.

BACKGROUND OF THE INVENTION

Previously for vehicle car washes, there have been difficulties in efficiently and effectively removing accumulated water from a washed vehicle for properly drying the vehicle thereby avoiding spotting and streaking. Heretofore blower assemblies used in vehicle dryers have been made of metallic construction with interrupted wall interiors, interior obstructions including fasteners so that the flow of high velocity air from the power rotated impeller was turbulent, noisy and inefficient.

There have been difficulties in mounting the top air nozzle or nozzles within the framework of a vehicle dryer so that it efficiently directs high velocity air down onto the vehicle as it passes therethrough. There have been further difficulties in efficiently directing high velocity air from opposite sides of the vehicle as it moves through the framework for driving the droplets off the vehicle and drying the vehicle as it passes therethrough.

Problems have also been encountered wherein the top nozzle or nozzles come into actual engagement with the vehicle top surfaces resulting in the possibility and likelihood of damage or scratching of the surfaces. Similar problems have existed with respect to the side nozzles since vehicles are of varying width. There has also been difficulty in drying the vehicle when passing through the car dryer apparatus since the side nozzles are fixed for a wide vehicle, and such side nozzles do not effectively dry the narrower vehicles.

There have been difficulties in providing mechanical devices by which the top nozzles and side nozzles may be retracted to prevent damage to a vehicle as it passes therethrough and at the same time blow off accumulated water from the washed vehicle in an efficient manner so as to leave the vehicle dry and without streaking.

There have also been difficulties in providing a proper angle of attack of the top nozzle as well as the side nozzles for direction of the high velocity air onto the opposed sides of the vehicle for the most efficient movement of air over the vehicle body surfaces as the car moves through the framework.

Heretofore in many car wash assemblies within the framework there is usually a conveyor mechanism adapted to receive the wheels upon one side of the vehicle. However, due to differing widths of vehicles passing therethrough there is difficulty in properly mounting the opposed lateral air nozzles in an efficient attitude with respect to the sides of the vehicle and at the same time to remain out of contact with the vehicle.

SUMMARY OF THE INVENTION

An important feature of the present invention is to provide within the framework of an apparatus for drying vehicles a plurality of air nozzles and with a corresponding blower assembly for each nozzle and individually connected thereto for delivery of high velocity air to the respective nozzles.

Another feature is to provide an improved mounting for one or a pair of top air nozzles upon a framework and arranged transversely thereof to overlie a moving vehicle so that the laterally directed orifice of the top nozzle is at all times closely spaced adjacent the vehicle body during its forward movement and is never in contact therewith.

Still another feature is to provide a vertical lift assembly for supporting one or a pair of top nozzles together with electronic control mechanism and power operated lifting means connected with the mounting of the nozzles by which the top nozzles are automatically lifted predetermined amounts so as to be spaced at all times from and out of contact with the vehicle moving thereunder.

A further feature is to provide an improved mounting of the top nozzle upon the framework and upon the vertically adjustable support therefore by which the angle of attack of the top nozzle may be adjusted for the greatest efficiency in blowing water off the washed vehicle.

A still further feature is to provide within the framework upon its opposite sides a pair of substantially upright air nozzles having a plurality of inwardly directed orifices for directing high velocity air along the sides of the vehicle as the vehicle passes through the framework.

Another feature is to provide a support mechanism for the respective lateral or side nozzles so that the orifices are inclined rearwardly towards the vehicle at a predetermined efficient angle of attack for most efficiently removing the accumulated water or droplets from the vehicle body after it has been washed.

Still another feature is to provide the respective nozzle of a unit molded plastic material with insert fasteners molded into the body defining the respective nozzles in order to assist in the fastening and securing of the nozzles upon the framework.

A further feature is to provide upon the framework at opposite sides thereof a pair of inwardly and angularly directed support arms which have mount brackets at the outer ends which bear against and are secured to mount plates or pads and fasteners upon the respective side nozzles so as to effectively mount the nozzles in correct upright position with the proper angle of attack of its respective orifices directed towards an oncoming vehicle moving through the framework.

Still another feature is to provide for at least one of the side nozzles a pivotally mounted support arm arranged upon a vertical axis so that the side nozzle may be pivoted inwardly or outwardly with respect to one side of the vehicle to accommodate vehicles of different widths.

A further feature is to maintain a predetermined or preselected angle of attack of the orifices with respect to the vehicle regardless of the pivotal movement of the side nozzle with respect to the vehicle body as it passes through the framework.

A still further feature is to provide one or a pair of vertical lift rods at their ends guidably mounted upon the framework with the corresponding top nozzle suspended from the lift rod and wherein the lift rod may be angularly and rotatively adjusted for preselecting the angle of attack of the throated air outlet of the top nozzle with respect to a vehicle moving thereunder.

As an important feature of the present invention there is provided a remote controlled power means which is connected to the respective lift rod for successively raising and lowering the top nozzle housing to prevent contact with a vehicle moving through the framework.

A further feature includes a roller carriage mounted upon the framework for controlled vertical adjustments of the lift rod and wherein the vertical adjustments are controlled by a pair of cables suspended from pulleys upon the top of the framework and a power operated mechanism is employed for retracting the respective cables for elevating the lift rod and depending top nozzle so as to avoid contact thereof with any portion of the vehicle moving thereunder.

A still further feature includes electronic automatic control means in the form of an electric eye arrangement depending from the respective ends of the lift rod defining a fixed light beam which when broken by the presence of a vehicle establishes the electrical circuitry to a power mechanism for causing retraction of the cables connected to the lift rod and the top nozzle and to continue to retract the nozzle so that it is maintained spaced from the vehicle at all times as it passes thereunder.

It is a further feature that a sonar device be employed for determining the distance between the vehicle and the nozzle to which the sonar is attached.

Another feature is to provide an improved power operated mechanism for controlling retracting movements of the respective cables for the automatic vertical adjustments of the lift rod which supports the vertical nozzle and wherein the cables are connected to a carriage retractable by a cylinder assembly upon the top of the framework moving the cables over a series of pulleys for an automatic retraction of the cables for lifting the top nozzles out of the path of movement of the vehicle to avoid contact therewith at all times.

The present invention further includes as an important feature control box, electrical circuitry and a hydraulic unit or fluid source for operating the respective cylinders adapted for effecting automatic retraction of the top nozzle as required and under the control of electronic sensors as for example electric eye beams or an equivalent control mechanism, including a sonar apparatus.

Still another feature is to provide a cylinder control mechanism in conjunction with the pivotal mounting of the swing arm which supports one of the vertical air nozzles which responds to the spacing of the side surface of a vehicle passing through the framework to maintain a predetermined spacing between the side nozzle upon the swing arm together with electronic sonar control mechanism for controlling a fluid or pneumatic cylinder for pivoting the swing arm to maintain a predetermined spacing without contact with the vehicle.

These and other objects and features will be seen from the following specification and claims in conjunction with the appended drawings.

It will be understood that the above drawings illustrate merely a preferred embodiment of the invention, and that other embodiments are contemplated with the scope of the claims hereafter set forth.

DETAILED DESCRIPTION OF AN EMBODIMENT OF THE INVENTION

Figure 1:
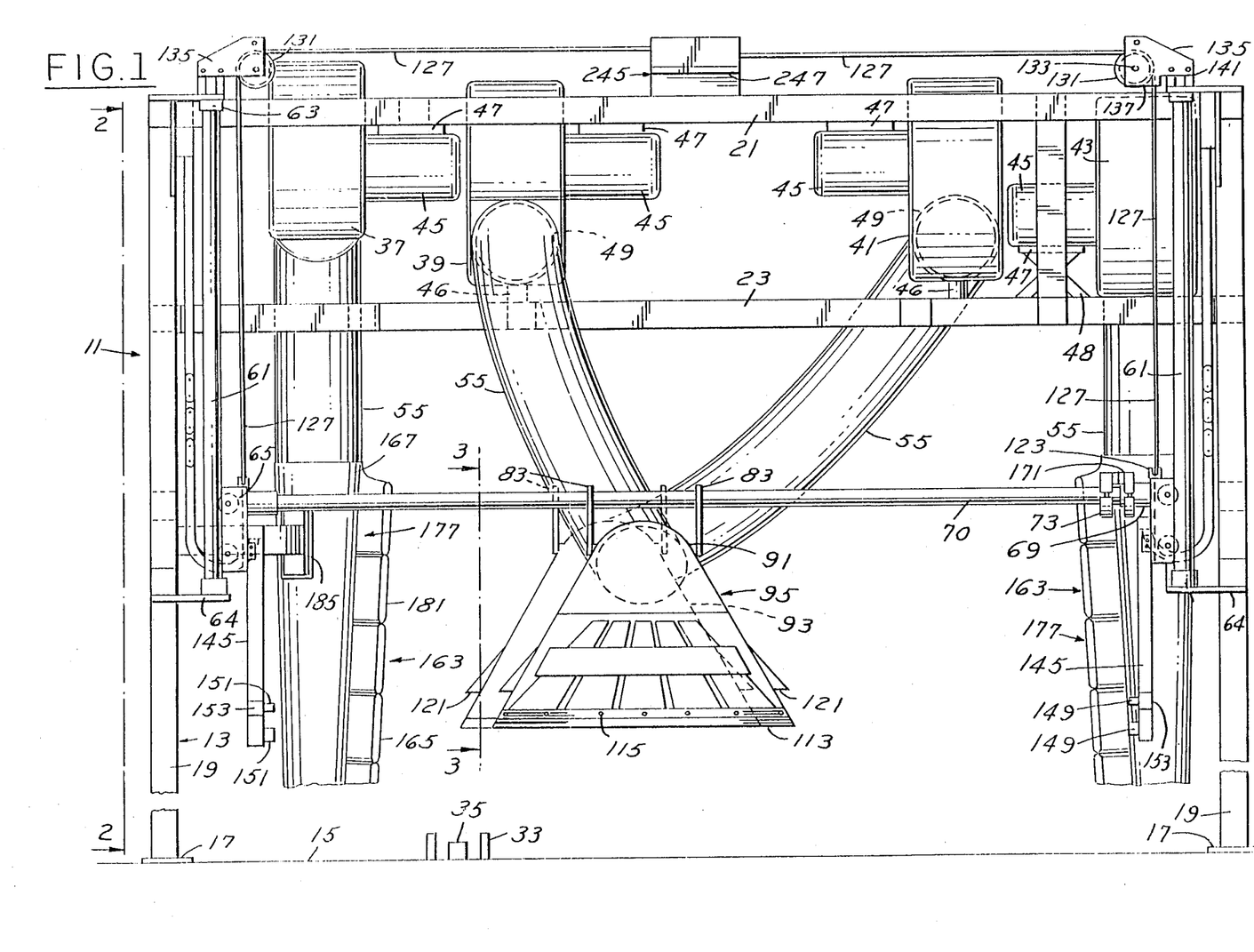
FIG. 1 is a fragmentary front elevational view of the apparatus for drying vehicles including the framework, blower assemblies and nozzles, with portions broken away, and viewing the apparatus as the vehicle approaches it.
Figure 2:
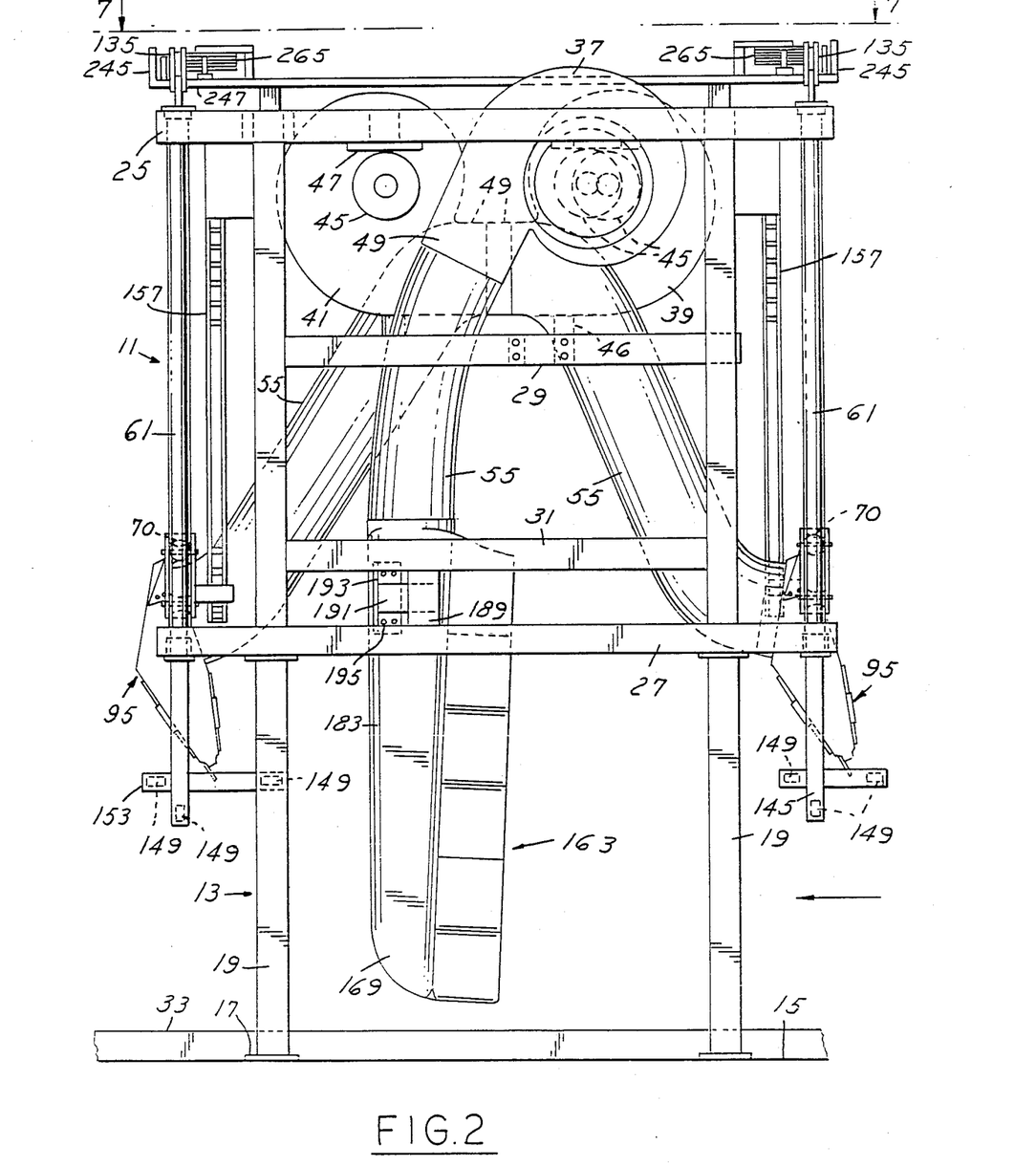
FIG. 2 is a side view taken in the direction of arrows 2—2 of FIG. 1.

Referring to FIGS. 1 and 2, an apparatus for drying vehicles or a car wash dryer is designated at 11 with the entrance thereto shown in FIG. 1. The apparatus 11 includes an upright open framework 13 arranged upon floor surface 15 and having an axis corresponding to the path of movement of a vehicle therethrough as designated by the arrows in FIGS. 2 and 9. The framework 13 includes a series of anchor plates 17 for mounting and securing the apparatus 11 to the floor surface and a plurality of front and rear uprights 19, top cross members 21 and cross members 23 as shown in FIG. 1 and side top members 25, side bottom members 27, and additional side members 29 and 31 as shown in FIG. 2.

Applied to floor surface 15, FIG. 1 and 2, is a channel or trackway 33 adapted to receive the left side wheels of a vehicle constraining the vehicle to rectilinear movements through the framework 13 under the control of a power conveyor 35, fragmentarily shown.

A plurality of air blower assemblies sometimes referred to as first air blower assembly 37, second air blower assembly 39, third air blower assembly 41 and fourth air blow assembly 43, such as defined in detail in Applicant' United States copending patent application Ser. No. 045,331, filed May 4, 1987, are mounted and suspended upon the framework 13 adjacent the top thereof, FIGS. 1 and 2. The respective blower assemblies are individually mounted upon electric motors 45 which through mount brackets 46 in FIG. 2, mount plates 47 and additional mount brackets 48, FIG. 1, are secured upon upper portions of the framework. Each blower assembly includes a motor operated internal impeller 44, FIG. 9. Each of the respective air blower assemblies 37, 39, 41 and 43, such as shown at 43 in FIG. 9 includes an air inlet cone 51 including an apertured mount flange for fastening to the housing of the blower assembly 43, including a protective screen 53. Each of the respective blower assemblies include a tangential outlet 49 adapted to receive thereover the respective flexible hoses 55 secured thereto by the clamp assembly 59, FIG. 3.

Each of the corresponding blower outlets 49 is a part of the molded plastic blower housing and includes an annular bead 57 adjacent the end thereof over which is positioned the corrugated flexible hose 55. The hose 55 interlocks with bead 57 in the manner shown in FIG. 3. Annular bead 57 is in cooperative registry with a portion of flexible hose 55, preferably constructed of polyurethane and of a corrugated wire reinforced construction.

Figure 3:
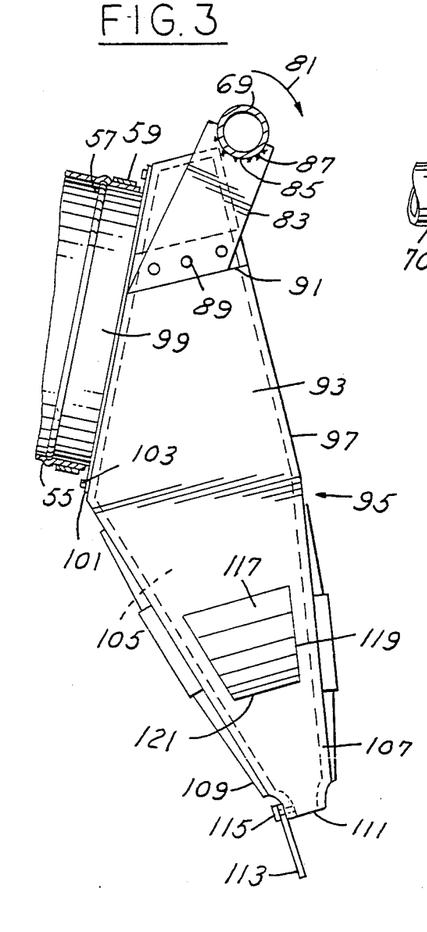
FIG. 3 is a fragmentary side view of the top nozzle taken in the direction of arrows 3—3 of FIG. 1, on an increased scale, with portions of the connecting hose and clamp broken away and sectioned.

The framework 13 has mounted thereon a means by which top air nozzle 95, FIGS. 1 and 3, may be vertically adjusted automatically. For this purpose there is provided a pair of laterally spaced upright parallel guide rods 61 carried by plates 64 upon framework 13, FIG. 1.

A pair of opposed carriage roller assemblies 65 each includes upright out-turned housing 66 of U-shape in plan mounting longitudinally spaced guide roll 67 of concave shape journaled at 68 within the housing 66 and adapted for cooperative retaining engagement with the corresponding guide rod 61. Each of the housings 66 have opposed inwardly directed sleeves 69 which receive and support opposite ends of the corresponding vertical lift rod 70, FIG. 1.

Figure 4:
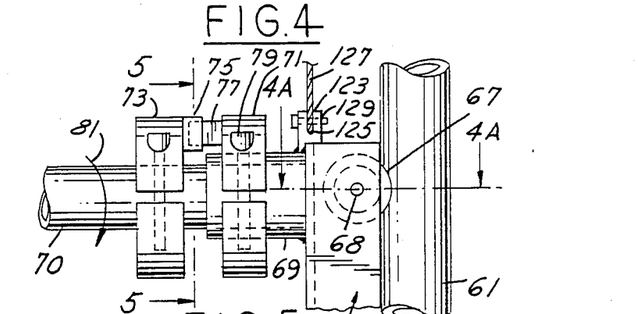
FIG. 4 is a fragmentary front view of the support for the vertical lift rod of the top nozzle shown in FIG. 1.
Figure 4A:
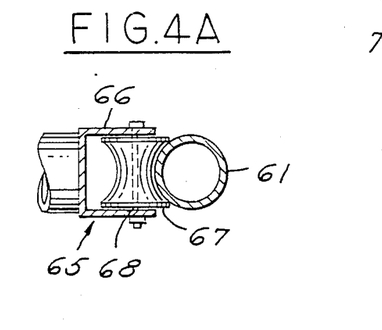
FIG. 4A is a fragmentary view in section taken on the line 4A—4A of FIG. 4.
Figure 5:
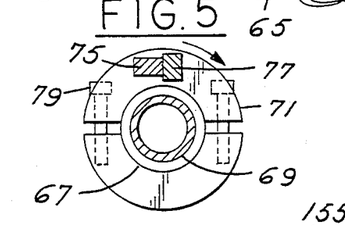
FIG. 5 is a section taken in the direction of arrows 5—5 of FIG. 4.

The split sleeve clamp 71, FIGS. 4 and 5 is rotatably adjustable upon the corresponding sleeve 69 and is spaced from a corresponding split rod clamp 73. A suitable clamp interlock 75–77 extends between the respective clamps 71 and 73 so that the two clamps are adapted to rotate together, with clamp 73 secured upon vertical lift rod 70. When the shaft 70 has been rotated to a preselected angular position defining the angle of attack of the top nozzle 95, it is secured in such a position by tightening fasteners 79 upon clamp 71. Rotary adjustment of vertical lift rod 70 is designated by arrow 81 in FIGS. 3 and 4. The purpose of providing the clamp interlock 75–77 is to allow or permit the nozzle 95 to rotate in a predetermined direction if the nozzle is contorted by the vehicle, for example, a runaway car. This feature reduces possible damage to the vehicle.

For the support and mounting of top nozzle 95 there are provided a pair of laterally spaced upright support arms 83 which have semicircular recesses 85 at their upper ends which receive spaced portions of rod 70 and are secured thereto by welds 87, FIG. 3. The corresponding apertured lower ends of support arms 83 receive fasteners 89 which extend into molded insert fasteners within mount blocks 91 upon opposite sides of top nozzle 95, FIGS. 1 and 3.

Top air nozzle assembly 95, FIG. 1, includes laterally diverging side walls 93 which form a part of the unit molded plastic body 97 in FIG. 3. Circular inlet 99 having an annular bead 57 thereon includes an apertured mount flange 101 which bears against one wall of top nozzle body 97 and is secured thereto by a plurality of spaced fasteners 103. These fasteners 103 project into corresponding molded insert fasteners, not shown, which are molded into a portion of the unit molded plastic body 97 of the top air nozzle assembly 95. The detail of this construction is shown in our copending patent application Ser. No. 045,356, filed May 4, 1987.

The corresponding side walls 93 define with the unit molded plastic body 97 the laterally diverging air chamber 105, FIG. 3, and towards the lower end the converging walls 107 and 109 defining therebetween the laterally elongated throated outlet 111 which extends across the width of the top air nozzle 95 shown in FIG. 1.

Elongated flexible air deflector blade 113 extends across and below the end of throated outlet 111 and is secured to a lower portion of the body upon converging wall 109 by a plurality of fasteners 115, FIG. 3. Laterally diverging hoods 117 are mounted upon lower end portions of the respective diverging side walls 93, are downwardly converging as at 119 FIG. 3 and define orifices 121 in communication with air chamber 105. These orifices are adapted for directing streams of air laterally outward of top nozzle 95 to reach lateral areas of a vehicle outwardly of throated outlet 111.

With respect to the opposed pair of guide carriages 65 which mount the lift rod 70, at the top thereof is an upwardly extending clevis 123 apertured to receive the eye 125 on the end of lift cable 127 secured thereto by the transverse cable anchor bolt 129. The respective lift cables 127 extend over the idler pulleys 131 journaled at 133 between side plates 135 of the pulley support. The depending portion 137 of side plate 135 provides a positive stop for clevis 123. On upward travel of carriage 65 it bottoms out on the positive stop 137. This therefore limits upward movement of the corresponding opposed carriages 65 upon guide rods 61.

The respective side plates 135 defining the pulley support for idler pulley 131 are anchored at 141 upon the top of the top cross side member 25 of the framework so as to overlie the respective carriages 65. Upon the side of carriages 65 remote from the corresponding concave rollers 67 there is provided an apertured sensor mount bracket 143 which is welded to the tubular sensor mount arm 145 and is secured thereto by fasteners 147, FIG. 6.

The sensor arm 145 towards its lower end mounts electronic receiver 149, FIG. 2, which is laterally opposed to a corresponding depending sensor mount arm 145 upon the opposite side of the framework and depending from the corresponding opposed carriage 65 mounting corresponding electronic emitter 151 which is aligned with electronic receiver 149 for establishing a light beam therebetween. Additional electronic receivers 149 and electronic emitters receivers 151 are applied to the cross arms 153 adjacent the lower end of the sensor mount arms 145, FIG. 2.

Figure 6:
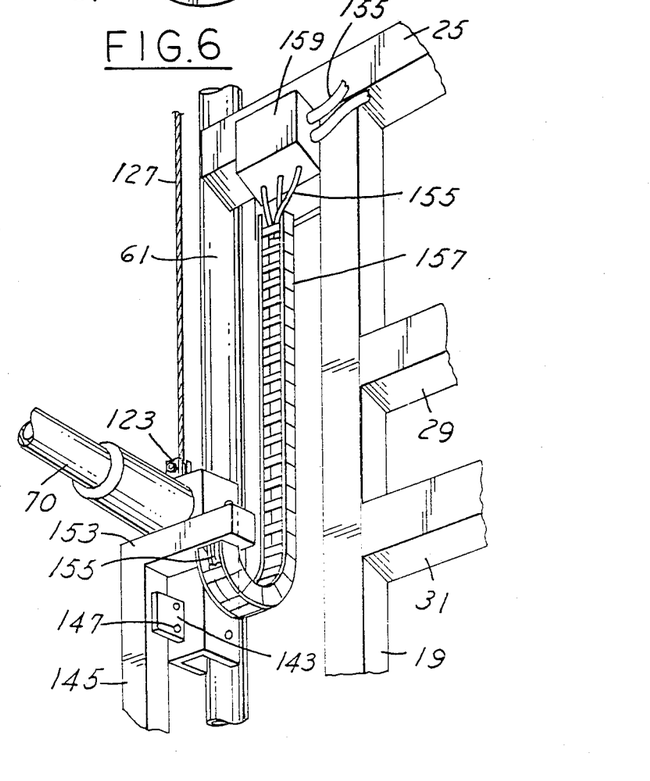
FIG. 6 is a fragmentary perspective view illustrating the mounting of the vertical lift rod for the top nozzle and electrical connections thereto upon the framework fragmentarily shown.

The upper end of sensor mount arm 145 is tubular at 153 and is adapted to enclose a series of power leads 155 which extend through the flexible power cable assembly 157 to electrical box 159 on the cross member 25 of the framework, fragmentarily shown in FIG. 6. This accommodates vertical adjustments of the respective carriages 65 while maintaining proper electrical connections through leads 155 to the corresponding receivers and emitters 149–151.

Figure 9:
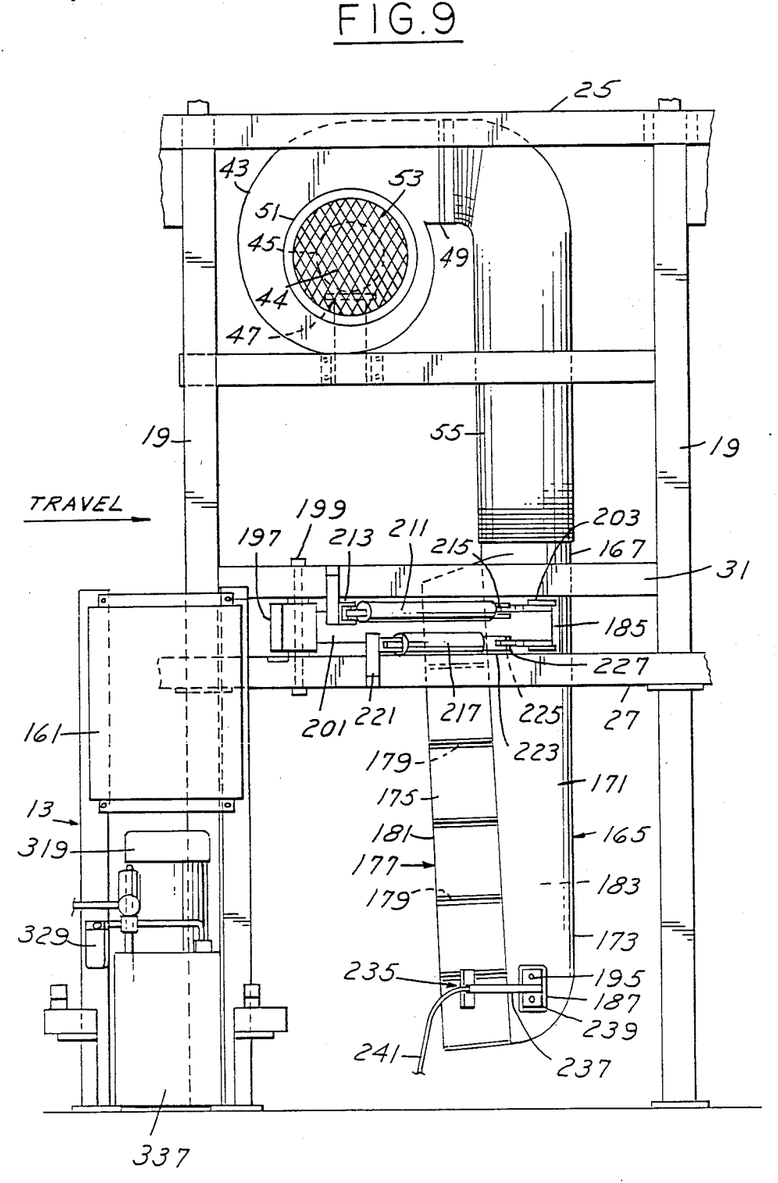
FIG. 9 is a fragmentary side elevational view of the apparatus illustrating the adjustable side nozzle mounting on the right hand side considering the direction of travel designated by the arrow and corresponding to FIG. 1.

These leads 155 are connected to control box 161, FIG. 9, and a suitable electrical power source upon framework 13 to establish proper power to the respective electric receivers 149 for creating the corresponding beams between the eyes and the opposed electronic emitters 151.

Referring to FIGS. 1, 2 and 9, positioned within framework 13 on opposite sides thereof are a pair of opposed elongated upright side air nozzles 163 having a unit molded plastic body 165 of a plastic material such as a high molecular weight polyethylene. The nozzle body 165 includes an integral molded air inlet 167, front wall 169, rear wall 171 and connecting end wall 173. The corresponding front and rear walls 169, 171 terminate in the opposed concave converging sides 175 defining the elongated lateral nozzle 177. Extending between concave converging walls 175 are a series of spaced transverse internal ribs 179 defining in the nozzle a plurality of aligned throated orifices 181 in communication with air chamber 183 defined by the walls, FIG. 11.

Each of the unit molded plastic bodies 165 defining the nozzles 163 have molded therein upon one side a top mount plate or pad 185 as a unit part thereof. In the rotational plastic molding operation forming body 165 a plurality of insert fasteners are enclosed and anchored within wall portions of the body adjacent top mount pad 185 and flush therewith. This is disclosed in our copending patent application, Ser. No. 07/054,631, filed May 27, 1987.

Spaced from top mount pad 185 and also molded within the body is a bottom mount plate or pad 187, FIG. 9. Similar insert fasteners are molded into pad 187 during manufacture.

It is contemplated that in operation a vehicle moves through framework 13 in the direction of the arrows shown in FIGS. 2 and 9. The respective side nozzles 165 are suitably mounted in a substantially upright position and affixed to the framework. The left hand nozzle housing 163 fragmentarily shown in FIG. 12, and further illustrated in FIG. 2, is arranged in a substantially preset stationary position. Its mounting includes mount block 189, FIG. 2, interposed between side frame members 27 and 31 and suitably secured thereto. Horizontally disposed air nozzle support arm 191 is connected to and extends forwardly and inwardly from mount block 189 and terminates in the apertured mount flange 193.

Figure 12:
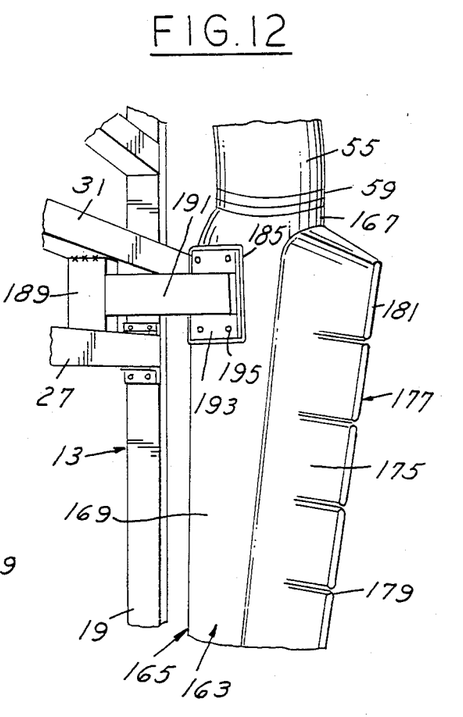
FIG. 12 is a fragmentary perspective view of the framework and a portion of the other side air nozzle fixedly mounted thereon.

The mount flange 193 overlies mount pad 185 upon the side nozzle housing and is secured thereto by a plurality of fasteners 195, FIG. 12. These fasteners 195 extend through apertures in mount flange 193 and into corresponding molded insert fasteners within body 165 adjacent the mount pad 185. The inwardly directed orifices 181 are arranged substantially along the height of a vehicle passing through the framework 13 in the direction of the arrows shown in FIGS. 2 and 9 and are inclined rearwardly at an acute angle towards the moving vehicle in the range of 15° to 30°, approximately. In the illustrative embodiment the inclination is 30°, approximately.

The opposite upright side air nozzle 163 is of the same construction and is further shown in FIGS. 1 and 9, as adjustably mounted upon the framework 13. The air nozzle 163 is adapted for pivotal movements transversely inwardly and outwardly to adjust to changing widths of vehicles passing through the framework 13 constrained by the conveyor 35 and left wheel track 33, FIG. 1.

Figure 10:
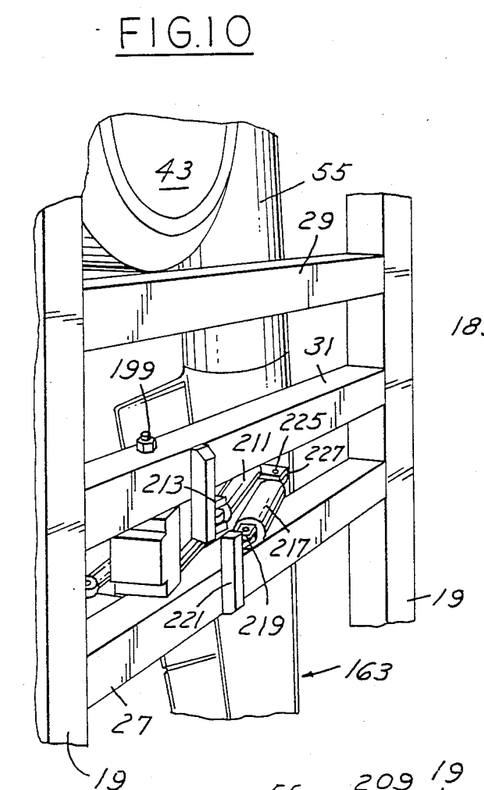
FIG. 10 is a fragmentary perspective view of the pivotal mounting of one of the side nozzles upon the framework in FIG. 9.
Figure 11:
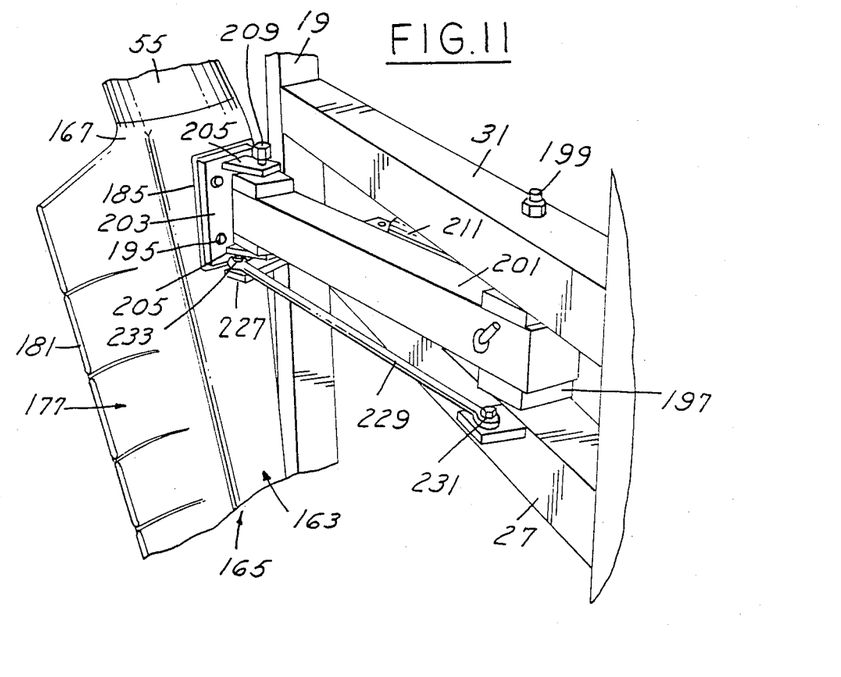
FIG. 11 is a fragmentary perspective view of the pivotal mounting for the side nozzle shown in FIG. 10, from the opposite side thereof.

For this purpose there is mounted upon the opposing side frame members 27 and 31 the mount block 197, shown in further detail in FIGS. 10 and 11, rotatably connected to the framework 13 by the upright pivot fastener 199. Mount block 197 receives and supports one end of horizontally disposed air nozzle support arm 201 which is thereby swingable upon vertical axis of fastener 199.

The substantially upright apertured mount flange 203 has a rearwardly directed clevis support 205 thereon and receives the outer free end of the air nozzle support arm 201 and is swivelly connected thereto upon a vertical axis by fasteners 209, being a second axis parallel to axis 199. The corresponding mount flange 203 overlies mount pad 185 upon one side of the body of the side nozzle 163 and is secured thereto by a plurality of fasteners 195. The fasteners 195 extend therethrough and into corresponding fasteners molded into portions of the body of the nozzle 163 in the same manner as above described with respect to mount plate in FIG. 12.

Accordingly, while the nozzle support arm 201 is pivotally adjustable in a horizontal plane to move the side nozzle 163 inwardly and outwardly to accommodate vehicles of different widths, the corresponding nozzle body 165 is pivotally adjustable upon the second vertical axis 209 so as to maintain a preset angle of attack of the respective nozzles 181 as extending towards a vehicle moving through the framework in the range of 15°–30°, approximately. In the illustrative embodiment this angle has been present at 30°, approximately, for the best angle for directing high velocity air to the sides of the vehicle as it moves through the framework 13 for the efficient removal of water therefrom without leaving streaks upon the vehicle body.

In order that the pivotal movement of the air nozzle body 165 in FIG. 11 be controlled with respect to support arm 201, there is provided a shock absorber 211, FIG. 10. The shock absorber 211 is in the form of a pneumatic or hydraulic closed cylinder, with one end pivotally mounted at 213 upon a vertical axis to the frame side bar 31. Its piston rod 215 is connected to mount flange 203, FIG. 9.

Remote controlled power operated cylinder 217, FIG. 10, is arranged upon a horizontal axis and at one end is pivotally mounted upon a vertical axis at 219 on bracket 221 upon side bar 27 of the framework 13. Its piston rod 223, FIG. 9, is pivotally connected at 225 to one end of transverse control arm 227 which underlies and is connected to part of the clevis support 205 of mount flange 203. Elongated tie bar 229 is pivotally anchored at 231 to frame element 27 at one end, and at its other end is pivotally connected at 233 to control arm 227, FIG. 11.

The tie bar 229 is parallel to the nozzle support arm 201, FIG. 11, in a parallelogram construction so that once a particular preselected angle of attack has been determined for the nozzles 181, regardless of the pivotal movement of support arm 201 for side nozzle body 165, the linkage including control arm 227 will maintain the orifices 181 at the same preselected angle of attack inclined rearwardly towards the oncoming vehicle at an angle in the range of 15° to 30°, and preferably 30°, approximately.

Since the vehicle being washed and dried has its left wheels moving along the fixed track 33, FIG. 1, depending upon the width of the vehicle the distance from any vehicle to the adjacent side air nozzle 163 will vary. In accordance with the present invention electronic means are employed for automatically moving the corresponding side air nozzle 163 inwardly and outwardly so as to maintain a preselected distance between the nozzle and the sides of the vehicle as for example six (6) inches. For this purpose there is provided a sonar detector or sensor shown in FIG. 9 at 235. The detector 235 is secured to the bottom mount pad 187. The sonar detector 235 transmits or directs a high frequency sonar signal towards the opposing side surface of the vehicle and detects the distance between the sonar transmitter and the vehicle surface. This is determined by the elapsed time between the sending of the signal or transmission and the receipt of a reflection or response from the vehicle. The detector 235 produces three conditions. One condition of the detector is to bring the nozzle in relative to the vehicle. A second condition of the detector is to allow the side nozzle to maintain a position relative to the side surface of the vehicle. Finally, the third condition of the detector 235 is to allow the side nozzle to move away from the side surface of the vehicle. The detector 235 has a receiver which normally faces the vehicle body and is mounted upon a support arm 237. The arm 237 has an apertured mount flange 239 which overlies bottom mount flange 187 upon the nozzle housing and is secured thereto by a plurality of fasteners 195, FIG. 9.

The sonar device or detector 235 is electrically connected by the lead 241, fragmentarily shown, into a power source and to other control means within the control box 161, FIG. 9. This is to provide an automatic means controlled by the sonar device 235 for energizing cylinder 217, FIG. 10, for automatically swinging the nozzle support arm 201 inwardly or outwardly about axis 199 so as to maintain the correct spaced relationship of the upright row of nozzles 181 with respect to a vehicle body passing through the framework 13. The above described linkage including tie bar 229 provides a means by which the nozzle body 165 and the nozzles 181 are arranged at the correct angle of attack.

Figure 7:
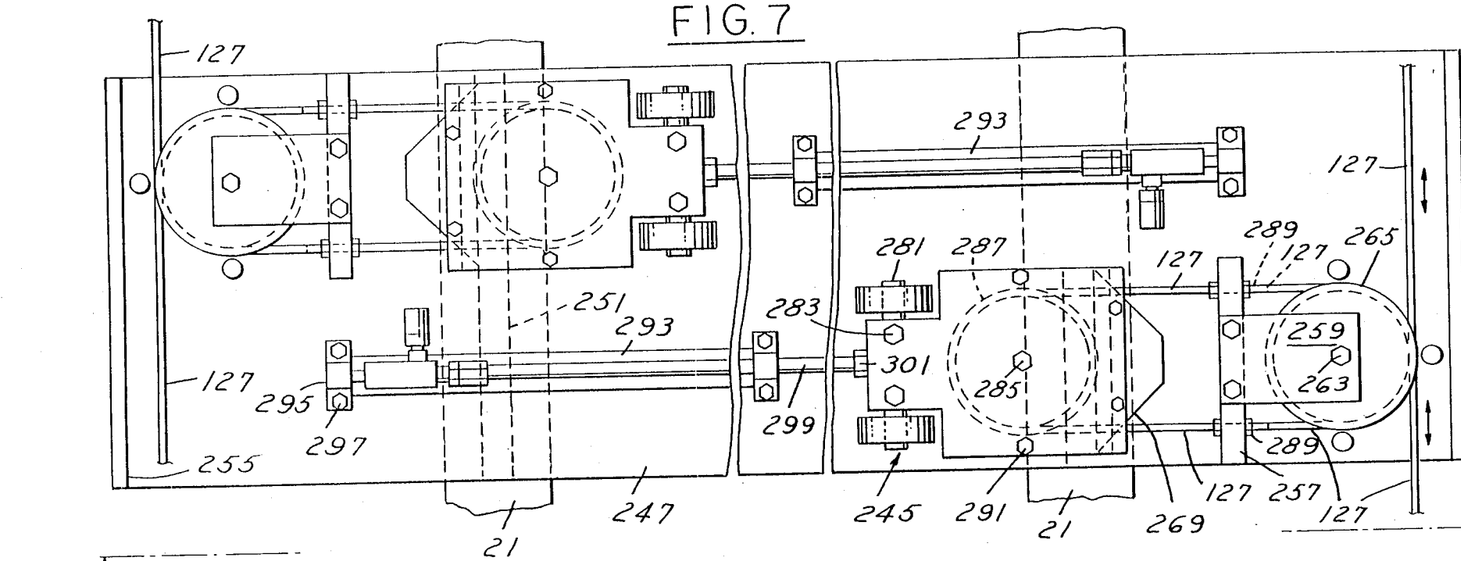
FIG. 7 is a fragmentary plan view taken in the direction of arrows 7—7 of FIG. 2 directed to the mechanism for retracting the respective lift cables for a pair of top nozzles.
Figure 8:
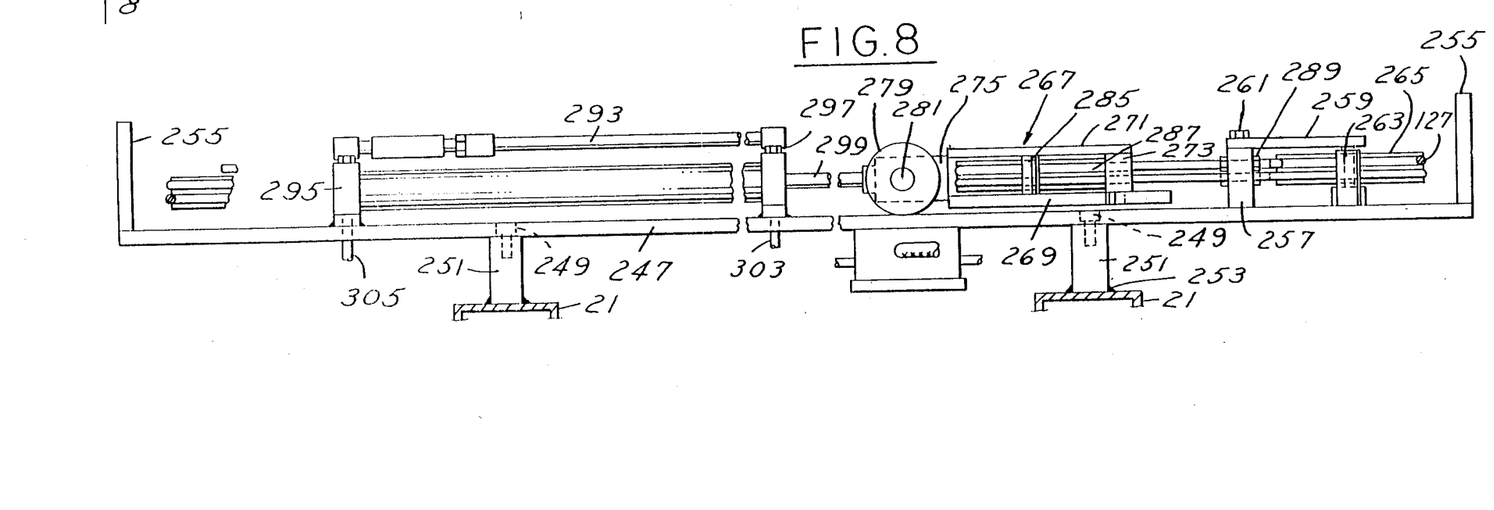
FIG. 8 is a fragmentary elevation, partly in section, taken in the direction of arrows 8—8 of FIG. 7.

The top nozzle lift assembly 245 is mounted upon framework 13 centrally thereof, FIG. 1, as shown in detail in FIGS. 7 and 8. The lift assembly 245 includes rearwardly extending platform 247 arranged centrally of the framework 13 and anchored at 249 upon the longitudinally spaced brackets 251 welded at 253 to the transverse frame members 21. The platform 247 has front and rear end plates 255.

Mounted upon platform 247 and parallel to the adjacent end plate 255 is the upright cable anchor plate 257. Top plate 259 at one end is secured to the cable anchor plate at 261 and at its forward end mounts with respect to platform 247 the upright journal 263 for the pair of aligned double idler pulleys 265. The pulleys are adapted to receive intermediate portions of the respective lift cables 127 from opposite sides of the framework 13, FIG. 1. The cables 127 extend over the corresponding top pulleys 131 and extend inwardly towards the top nozzle lift assembly 245.

Longitudinally reciprocal carriage 267 includes forwardly tapered bottom plate 269 and overlying top plate 271, and one or more spacers 273. At one end thereof the axial roller support 275 is fastened thereto and mounts transverse axial 281 receiving rollers 279 movable along platform 247.

Positioned within carriage 267 upon upright journal 285 between plates 269 and 271 is a second pair of aligned double idler pulleys 287 which respectively receive therearound intermediate portions of the respective cables 127 which extend rearwardly from around the first set of idler pulleys 265.

The top pulley 265 receives one of the cables 127 as for example the pulley shown to the near side of FIG. 7. The cable 127 extends around a portion of top pulley 265 loosely through cable anchor plate 257, around the top idler pulley 287 and returns to and extending through anchor plate 257 and is secured thereto at 289.

The other cable 127 extends around the lower of the pair of idler pulleys 265, FIG. 8, extends loosely through cable anchor 257, extends around the lower of the idler pulleys 287, and returns to and extends through anchor plate 257 and is secured thereto as at 289, shown in dash lines. A plurality of fasteners 291, FIG. 7, interconnect plates 269 and 271 of carriage 267.

One of the lift cylinders for a top nozzle 95 is shown in FIGS. 7 and 8 at 293 and supported by a pair of longitudinally spaced mount brackets 295 secured at 297 to platform 247.

The longitudinally reciprocal piston rod 299, fragmentarily shown in FIG. 8, projects axially from a piston, not shown, within cylinder 293 and extends and is connected to roller support 275 at 301, FIG. 7. Conduit 303, fragmentarily shown in FIG. 8, extends from the hydraulic unit 337 of FIGS. 9 and 13 into one end of cylinder 293. The cylinder conduit 305, fragmentarily shown, extends from the corresponding hydraulic unit and into the opposite end of cylinder 293. Conduits 303 and 305 are adapted for alternately providing pressurized fluid to the interior of cylinder 293 for effecting retraction of piston rod 299, such as for elevating one of the top nozzles 95, as for example top nozzle 95 as shown in FIG. 1.

When line 303 is pressurized the corresponding piston and piston rod 299 are retracted effecting longitudinal rearward movements of carriage 267 upon rollers 279. In view of the anchorage at 289 of the respective cable ends of cables 127, such retracting movement in effect simultaneously draws both of the cables 127 upwardly with respect to FIG. 1, around the corresponding pulleys 131 and correspondingly around the idler pulleys 265 and rearwardly for lifting the top nozzle 95. With this construction, there is a two to one mechanical advantage. The carriage moves one unit while the cables move two units.

Such lifting movements of the respective cables 127 will continue under the control of the electronic eyes (receivers and emitters) 149, 151 shown in FIG. 1. This would be a situation where normally there is a light beam between the respective electric receiver 149 and corresponding emitter 151 in an electrical circuit. When any portion of the forwardly moving vehicle breaks the beam between the receivers and emitters 149-151, an electrical switch or circuit is closed within an electric circuitry of the computer or other electrical system in connection with control box 161. The valve 311 will be energized in the manner disclosed in detail in FIG. 13 for activating cylinder 293, supplying fluid to intake conduit 303. Since the electric eyes (receivers and emitters) 149-151 are connected to and rise with cables 127, just as soon as the top nozzle 95 has been lifted so that the vehicle no longer obstructs the beam between such electronic eyes, the feed of fluid to the cylinder 293 will stop.

As the vehicle moves through the framework 13 under the top nozzle 95 the beams of the electric eyes 149-151 are re-established and the circuitry is such that there will be an automatic activation of the opposite valve and corresponding feed line 305 tending to lower the top nozzle 95 during continuous movement of the vehicle. Should the top nozzle 95 lower too fast or too far or should there be an interruption by the vehicle of any of the light beams 149-151, there will be an interruption of the beam reversing the operation of cylinder 293.

With the proper balance between the light beams or the electronic eyes (receivers and emitters) 149-151 with respect to the moving vehicle and pursuant to the disclosure herein automatic mechanism is provided by which the top nozzle 95 or both top nozzles 95 such as the additional nozzle at the exit end of the framework will be automatically elevated so as not to come in contact with the vehicle passing thereunder.

Figures 13, 14:
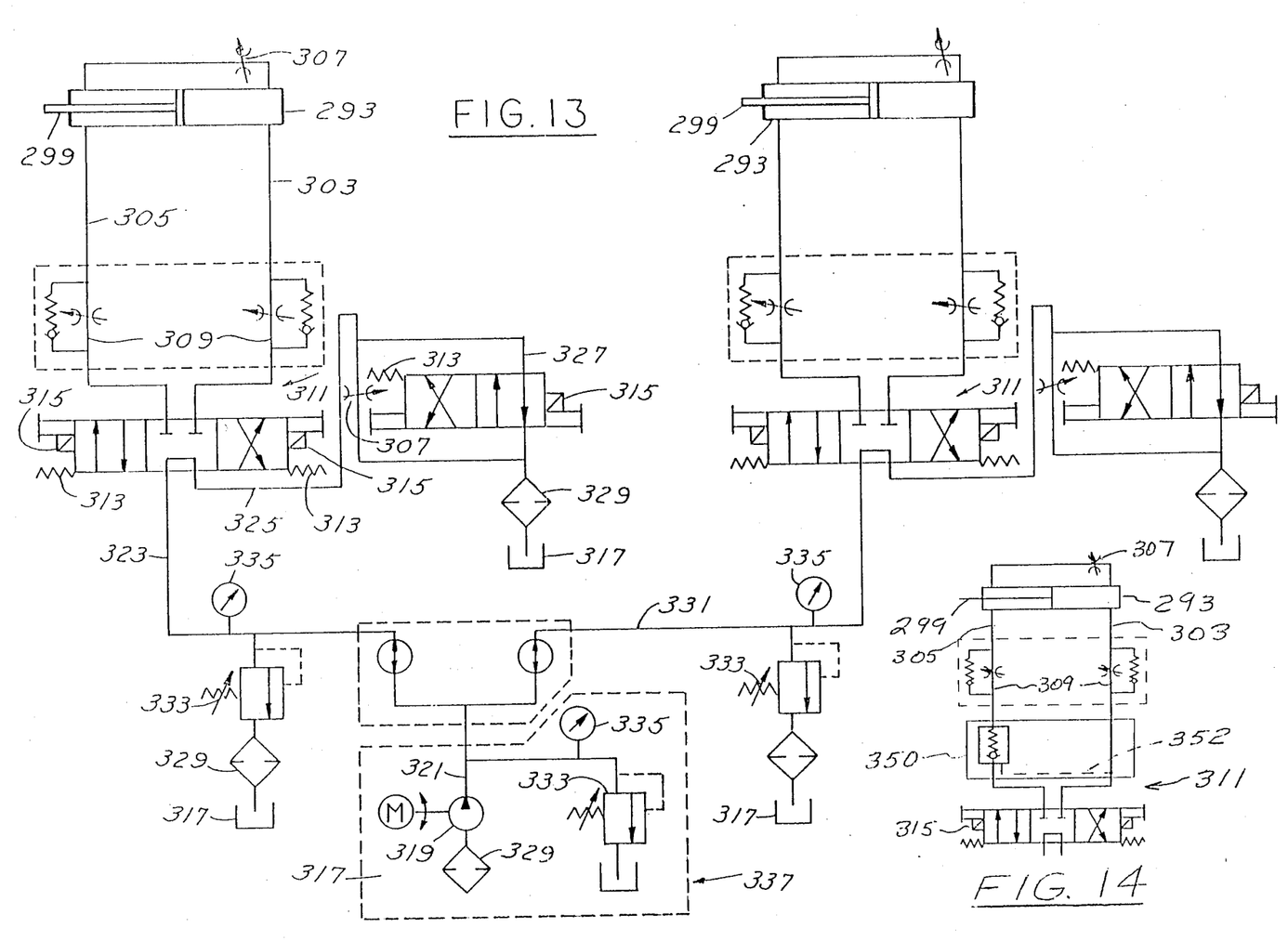
FIG. 13 is a schematic hydraulic diagram for the control mechanism including the hydraulic connections to the respective cable control cylinders shown in FIG. 7.
FIG. 14 is a modified hydraulic diagram, fragmentarily shown, illustrating a pilot-operated check valve incorporated in the cylinder lines for each top nozzle.

The above described cylinders 293, one for each of the top nozzles 295 front and rear on the framework 13 shown in FIG. 1 are shown in FIG. 13 at 293. Each cylinder includes reciprocal piston rod 299 connected to the corresponding carriage 267, one of which has been described in detail with respect to FIGS. 7 and 8.

An adjustable needle valve 307 is schematically shown in FIG. 13 in a conduit interconnecting opposite ends of cylinder 293. Adjustable flow control valves 309 are schematically shown interposed within the respective hydraulic or pneumatic lines 303 and 305 FIG. 13, which connect to the cylinder outlets of the three position double solenoid spring centered four-way directional control valve 311.

The movable valve element therein, as schematically illustrated, is shown in a centralized position due to the action of the opposing springs 313. Electric solenoids 315 are connected at opposite ends of the direction control valve 311 so that when energized effect movements of the valve element to one of the alternate two positions shown in FIG. 13.

A hydraulic reservoir is schematically shown at 317 and includes one or more pumps 319 which are motorized and include a pressure fluid line 321 and a connecting branch line 323 directed to the four-way directional control valve 311 with pressure gauge 335 interposed.

With the valve spool within the directional control valve 311 centered with neither of the solenoids 315 energized and held thereby the springs 313 exhaust fluid passes back through conduit 325 either through the dump valve 327 to the hydraulic reservoir 317 or directly by the line 325 through the filter 329 back into the reservoir.

The dump valve 327 is a two-position spring offset solenoid operated four-way valve with the spring shown at 313 and a solenoid shown at 315.

In normal operation with solenoid 315 energized overcoming spring 313 the valve spool within the dump valve 327 is so positioned that exhaust in line 325 will pass through the needle valve 307 and then through filter 329 into reservoir 317. This is employed in many situation where the respective cylinders 293 are inoperative and less energy is required merely to pump the hydraulic liquid to the four-way valve and let it be dumped through valve 327 right back to reservoir 317.

For any other position of the valve spool within four-way valve 311 the fluid flow is to one end or the other of cylinder 293 alternately through the conduits 305 and 303 respectively in a conventional manner controlling reciprocal movements of piston rod 299 of cylinder 293.

The main pressure outlet pipe 321 from pump 319 connects to a branch line 331 for energizing the second cylinder 293 for controlling the other of the cylinders 293. A suitable gauge 335 is interposed in the line 323 and line 331 leading to the second three-position double solenoid spring centered four-way directional valve 311.

The circuit is duplicated and its description is not repeated. Adjustable pressure relief valves 333 are interposed where shown in the hydraulic circuit for return of excess pressure fluid through corresponding filters 329 and back into reservoir 317. The present reservoir 317 forms a part of or is enclosed within the hydraulic unit 337 shown in FIG. 9.

As noted in FIG. 1, the back nozzle 95 is laterally offset from the front nozzle 95. This results in better air coverage or direction of the air across the vehicle surface without interfering with the vehicle's antenna.

The top nozzles, side nozzles and blower housing are made from molded plastic material such as high molecular weight polyethylene. The framework 13 is made from structural aluminum members. The flexible hose 55 is made from urethane or other suitable plastic material. The hose 55 has a series of corrugations which are wire reinforced and adapted for interlock with the inlet bead to the corresponding nozzle or blower housing.

The apparatus for drying vehicles as disclosed herein is a non contact dryer since no part of the dryer touches the vehicle. With such an apparatus, the top nozzles may be programmed to be in a lower position as shown in FIG. 1 as the car approaches the entrance. Alternatively, the top nozzles 95 may be positioned in an elevated or raised position and after the vehicle approaches the entrance and is within the framework 13, the top nozzles 95 are lowered so as to approach but not contact the vehicle. The top nozzles 95 follow the contour of the vehicle so that after the nozzles clear the hood area of the vehicle, the nozzles are automatically moved upwardly in order to clear the windshield and the top of the vehicle. It is been found that the vehicles can be more effectively dried with the nozzles 95 starting the cycle in a raised position since it is believed that an air curtain is formed within the framework 13. This curtain of air assists in removing the drops of water from the vehicle. As the top nozzles 95 are lowered from the raised position, the air moves the air curtain or surrounding air within the confides of the framework 13, thereby resulting in increased drying of the vehicle. Once the vehicle has exited from the apparatus or dryer 11, the nozzles 95 will remain in a generally lowered position as the next vehicle approaches. If no vehicle is approaching the dryer, the top nozzles 95 are returned to the raised positions ready for the next automatic drying cycle.

If the top nozzles 95 of the apparatus start the cycle in a raised position, as just described, it is necessary to modify the hydraulic circuit or diagram of FIG. 13 by incorporating therein, as shown in FIG. 14, in lines or conduits 305 and 303 a pilot-operated check valve 350. The check valve 350 is closed when the nozzle is up and prevents the nozzle from drifting when in the rest or raised position. This is due to the fact that the fluid in the line 305 between the rod end of the cylinder 293 and the closed check valve 350 cannot escape, thus preventing the piston and rod 299 from moving in the cylinder.

When the pressure of the fluid in conduit 303 increases or builds up, it also increases in the pilot line 352 which connects conduit 30 with the check valve 350. The increased fluid pressure unseats the ball of the check valve 350, permitting the fluid from the rod end of the cylinder 293 to flow across the check valve 350. The pressurized fluid activates the piston and rod of the cylinder 293, thereby lowering the corresponding top nozzle.

It should be understood that the rod 70 and associated left mechanism may be used to operate one or more water nozzles, wax applications or other fluid dispensers in a car wash car treating apparatus.

Having described our invention, reference should now be had to the following claims.

We claim:

1. In an apparatus for drying vehicles, a framework upon a floor surface having an axis adapted to receive a vehicle moving along said axis;
   a transverse rotatable lift rod having ends which are guidably and rotatably mounted upon said framework for providing controlled vertical adjustments and rotational movement of said lift rod;
   a transverse top nozzle housing connected to and depending from said lift rod for controlled vertical adjustments and for rotational movement therewith, said top nozzle housing when accidentally struck by a vehicle moving through said framework rotating said lift rod and swinging out of the path of the vehicle as it moves along the axis;
   said top nozzle housing having an air inlet at its top communicating with an air chamber and downwardly extending laterally spaced sidewalls terminating in an elongated throated, downwardly opening air outlet communicating with said air chamber:
   a pair of opposed elongated upright side air nozzle housings mounted upon opposite sides of said framework, each side air nozzle housing having an air inlet at its upper end, an elongated air chamber communicating with said air inlet and an elongated lateral nozzle including a series of vertically aligned orifices extending approximately the height of a vehicle, and inclined rearwardly at an acute angle toward the vehicle;
   a plurality of motor-operated air blowers mounted upon said framework with each blower having an air outlet;
   a plurality of flexible hoses interconnecting the air outlet of each blower with one of the housing air inlets respectively;
   remote-controlled power means upon said framework connected to said lift rod for successively vertically raising and lowering said top nozzle housing to normally prevent contact with a vehicle moving through said framework;
   said connection of said top nozzle housing to said lift rod including a pair of spaced mount blocks upon said housing sidewalls as a part thereof; and
   a pair of laterally spaced upright support arms at their upper ends secured to said lift rod and at their lower ends secured to said mount blocks.

2. In the apparatus of claim 1, said support arms before securing to said lift rod being angularly adjusted relative to said lift rod and welded thereto, said top nozzle housing being inclined downwardly and rearwardly towards a vehicle moving thereunder.

3. In the apparatus of claim 1, said mount blocks being molded with said top nozzle housing with insert fasteners molded into said mount blocks;
   the securing of said support arms to said mount blocks including a plurality of fasteners extending through said support arms and into the insert fasteners within said mount blocks.

4. In an apparatus for drying vehicles, a framework upon a floor surface having an axis adapted to receive a vehicle moving along said axis;
   a transverse rotatable lift rod having ends which are guidably and rotatably mounted upon said framework for providing controlled vertical adjustments and rotational movement of said lift rod;
   a transverse top nozzle housing connected to and depending from said lift rod for controlled vertical adjustments and for rotational movement therewith, said top nozzle housing when accidentally struck by a vehicle moving through said framework rotating said lift rod and swinging out of the path of the vehicle as it moves along the axis;
   said top nozzle housing having an air inlet at its top communicating with an air chamber and downwardly extending laterally spaced sidewalls terminating in an elongated throated, downwardly opening air outlet communicating with said air chamber;
   a pair of opposed elongated upright side air nozzle housings mounted upon opposite sides of said framework, each side air nozzle housing having an air inlet at its upper end, an elongated air chamber communicating with said air inlet and an elongated lateral nozzle including a series of vertically aligned orifices extending approximately the height of a vehicle, and inclined rearwardly at an acute angle toward the vehicle;
   a plurality of motor-operated air blowers mounted upon said framework with each blower having an air outlet;
   a plurality of flexible hoses interconnecting the air outlet of each blower with one of the housing air inlets respectively;
   remote-controlled power means upon said framework connected to said lift rod for successively vertically raising and lowering said top nozzle housing to normally prevent contact with a vehicle moving through said framework;
   said power means for raising and lowering said lift rod including a pair of upright laterally spaced opposed guide rods upon said framework;
   opposed upright roller housing journaling rollers in snug guided registry with said guide rods and having opposed inwardly directed sleeves which supportably receives opposite ends of said lift rod and mounts said lift rod for rotation; and
   power-operated retractable lift cables depending from said frame and connected to said roller housings respectively.

5. In the apparatus of claim 4, said lift rod being rotatably and angularly adjustable within said opposed sleeves; and
   clamp means interposed between one of said roller housing sleeves and said lift rods for securing the lift rod in adjusted position for determining the downward and rearward inclination of said top nozzle housing relative to a vehicle passing thereunder.

6. In the apparatus of claim 5, said clamp means including a first clamp secured upon said one roller housing sleeve;
a second clamp rotatably mounted upon said rotatable lift rod for interlock with said first clamp; and
fastening means for securing said first clamp in adjusted position upon said roller housing sleeve.

7. In the apparatus of claim 4, said power means further including a pair of laterally spaced pulley supports upon said framework overlying said roller housings, said pulley supports journaling pulleys respectively receiving said lift cables;
the connection of said cables to said roller housings including an upright clevis upon each roller housing; and
an eyelet upon the end of each cable nested and retained within each clevis;
engagement of each clevis with said pulley supports limiting retracting movements of said cables.

8. In an apparatus for drying vehicles, a framework upon a floor surface having an axis adapted to receive a vehicle moving along said axis;
a transverse rotatable lift rod having ends which are guidably and rotatably mounted upon said framework for providing controlled vertical adjustments and rotational movements of said lift rod;
a transverse top nozzle housing connected to and depending from said lift rod for controlled vertical adjustments and for rotational movement therewith, said top nozzle housing when accidentally struck by a vehicle moving through said framework rotating said lift rod and swinging out of the path of the vehicle as it moves along the axis;
said top nozzle housing having an air inlet at its top communicating with an air chamber and downwardly extending laterally spaced sidewalls terminating in an elongated, downwardly opening throated air outlet communicating with said air chamber;
a motor-operated air blower mounted upon said framework having an air outlet;
a flexible hose interconnecting said air outlet with the housing air inlet; and
remote-controlled power means upon said framework connected to said lift rod for successively raising and lowering said top nozzle housing to normally prevent contact with a vehicle moving through said framework.

9. In the apparatus of claim 8, said power means for raising and lowering said lift rod including a pair of upright laterally spaced opposed guide rods upon said framework;
opposed upright roller housings journaling rollers in snug guided registry with said guide rods and having opposed inwardly directed sleeves which supportably receives opposite ends of said lift rod and mounts said lift rod for rotation; and
power-operated retractable lift cables depending from said frame and connected to said roller housings respectively.

10. In the apparatus of claim 9, said lift rod being rotatably and angularly adjustable within said opposed sleeves; and
clamp means interposed between one of said roller housing sleeves and said lift rod for securing the lift rod in adjusted position for determining the downward and rearward inclination of said top nozzle housing relative to a vehicle passing thereunder.

11. In the apparatus of claim 10, said clamp means including a first clamp secured upon said one roller housing sleeve;
a second clamp rotatably mounted upon said lift rod for interlock with said first clamp; and
fastener means for securing said first clamp in adjusted position upon said roller housing sleeve.

12. In the apparatus of claim 9, said power means further including a pair of laterally spaced pulley supports upon said framework overlying said roller housings, said pulley supports journaling pulleys respectively receiving said lift cables;
the connection of said cables to said roller housings including an upright clevis upon each roller housing; and
an eyelet upon the end of each cable nested and retained within each clevis;
engagement of each clevis with said pulley supports limiting retracting movements of said cables.

13. In the apparatus of claim 9, said power means including a pair of laterally spaced opposed pulleys supported upon said framework overlying and receiving said cables respectively.

14. In the apparatus of claim 8, a platform upon said framework centrally of and arranged along said axis;
a pair of coaxial first idler pulleys upon said platform receiving said cables respectively;
an apertured cable anchor plate upon said platform receiving said cables;
a cylinder-operated carriage reciprocally mounted upon said platform; and
a pair of coaxial second idler pulleys journaled upon said carriage respectively receiving said cables, with end portions of said cables extending from said second idler pulleys and secured to said anchor plate;
whereby retraction of said carriage simultaneously retracts said cables lifting said top nozzle housing, and movement in the opposite direction permits simultaneous extension of said cables, lowering said top nozzle housing.

15. In the apparatus of claim 14, a roller support upon one end of said carriage; and
a pair of rollers journaled upon said roller support mounted upon said platform.

16. In the apparatus of claim 14, a cylinder mounted upon said platform having a reciprocal piston rod aligned with and connected to said carriage; and
remote-controlled electronic means for selectively activating said cylinder for successively raising and lowering said top nozzle housing maintaining said housing out of contact with a vehicle moving thereunder.

17. In the apparatus of claim 16, sensor mount arms secured respectively to and depending from said roller housings along the height of said top nozzle housing and therebelow; and
electric eye means mounted upon said sensor mount arms and connected to a circuit including a power source and control means for said cylinder, establishing a transverse light beam in the path of a vehicle moving through said framework;
any portion of said vehicle interrupting said beam activating said electronic means energizing said cylinder during and while said beam is interrupted, said electric eye means moving simultaneously with movements of said lift rod on the retraction of said top nozzle housing continuing until said light beam is re-established.

18. In an apparatus for drying vehicles, a framework upon a floor surface having an axis adapted to receive a vehicle moving along said axis;

a transverse rotatable lift rod having ends which are guidably and rotatably mounted upon said framework for providing controlled vertical adjustments and rotational movement of said lift rod;

a transverse top nozzle housing connected to and depending from said lift rod for controlled vertical adjustments and for rotational movement therewith, said top nozzle housing when accidentally struck by a vehicle moving through said framework rotating said lift rod and swinging out of the path of the vehicle as it moves along the axis;

said top nozzle housing having an air inlet at its top communicating with an air chamber and downwardly extending laterally spaced sidewalls terminating in an elongated throated, downwardly opening air outlet communicating with said air chamber;

a pair of opposed elongated upright side air nozzle housings mounted upon opposite sides of said framework, each side air nozzle housing having an air inlet at its upper end, an elongated air chamber communicating with said air inlet and an elongated lateral nozzle including a series of vertically aligned orifices extending approximately the height of a vehicle, and inclined rearwardly at an acute angle toward the vehicle;

a plurality of motor-operated air blowers mounted upon said framework with each blower having an air outlet;

a plurality of flexible hoses interconnecting the air outlet of each blower with one of the housing air inlets respectively;

remote-controlled power means upon said framework connected to said lift rod for successively vertically raising and lowering said top nozzle housing to normally prevent contact with a vehicle moving through said framework;

each of said side air nozzle housings having a mount plate thereon with a plurality of insert fasteners molded into said housing at said mount plate;

a pair of spaced opposed nozzle support arms at their one ends mounted upon opposite sides of said framework and inclined forwardly and inwardly;

an apertured mount flange upon the other end of each of said arms, bearing against said side nozzle mount plates; and a plurality of fasteners extending through said mount flanges and into the insert fasteners within said mount plates.

19. In the apparatus of claim 18, said acute angle of said vertically aligned orifices of each of said side air nozzle housings being in the range of 15 to 30 degrees.

20. In the apparatus of claim 18, said acute angle of said vertically aligned orifices being 30 degrees, approximately.

21. In the apparatus of claim 18, one of said support arms and the corresponding side air nozzle housing being fixedly mounted and the other support arms and the corresponding side air nozzle housing being pivotally mounted to accommodate vehicles of different widths.

22. In the apparatus of claim 21, the pivotal mounting of said other support arm being upon a vertical axis;

the mount flange for said other pivotal support arm being pivotally mounted upon the other end of said arm upon a second vertical axis;

whereby said preselected angle of said orifices can be maintained despite pivotal movements of its corresponding side air nozzle housing.

23. In the apparatus of claim 22, and remote-controlled power means upon said framework connected to said other pivotal support arm and to said pivotal mount flange for pivoting said support arm and said mount flange relative to said pivot arm for determining the position of the corresponding side air nozzle housing relative to the width of the vehicle.

24. In the apparatus of claim 23, said remote-controlled power means including a transverse control arm pivotally connected to said other pivotal support arm at its outer end and connected to said pivotal mount flange;

a fluid cylinder pivotally mounted upon said framework having a reciprocal piston rod pivotally connected to said control arm; and a tie bar parallel to said support arm at its ends pivotally connected to said framework and to said mount flange, for maintaining said orifice angle during pivotal movements of the corresponding pivotal side nozzle support arm.

25. In the apparatus of claim 24, and a sonar assembly mounted upon said pivotal side nozzle housing and facing the side of the vehicle passing through said frame, said sonar assembly controlling reciprocal movements of said piston rod for determining the spaced relation between said pivotal side nozzle housing and the vehicle.

26. In the apparatus of claim 24, and a shock absorber cylinder at one end pivotally mounted upon said framework and including a reciprocal piston rod connected to said pivotal arm adjacent to its outer end to assure a smooth pivotal adjustment of said pivotal side nozzle housing relative to said framework.

27. In the apparatus of claim 5, said top nozzle housing having outwardly inclined downwardly converging hoods upon said sidewalls forming lateral nozzles communicating with said top nozzle housing air chamber for increasing the lateral extent of high velocity air directed onto a vehicle moving thereunder.

28. In an apparatus for drying vehicles, a framework upon a floor surface having an axis adapted to receive a vehicle moving along said axis;

a pair of opposed elongated upright side air nozzle housings mounted upon opposite sides of said framework, each of said siding nozzle housings having an air inlet at its upper end, an elongated air chamber communicating with said air inlet and an elongated lateral nozzle including a series of vertically aligned orifices at one side of the housing extending from one end to the other end and spanning approximately the height of the vehicle, said aligned orifices being inclined rearwardly at an acute angle toward the vehicle;

a pair of motor-operated air blowers mounted upon said framework with each blower having an air outlet;

a pair of flexible hoses interconnecting the air outlet of each blower with one of said housing air inlets respectively;

each of said side air nozzle housings having a mount pad thereon with a plurality of insert fasteners molded into said housing at said mount pad;

a pair of spaced opposed nozzle support arms at their one ends mounted upon opposite sides of said framework and inclined forwardly and inwardly;

an apertured mount flange upon the other end of each of said arms, bearing against said side nozzle mount pads; and a plurality of fasteners extending through said mount flanges and into the insert fasteners in said mount pads.

29. In the apparatus of claim 28, said acute angle of said vertically aligned orifices of each of said side air nozzle housings being in the range of 15 to 30 degrees.

30. In the apparatus of claim 28, said acute angle of said vertically aligned orifices being 30 degrees, approximately.

31. In the apparatus of claim 28, one of said support arms and the corresponding side air nozzle housing being fixedly mounted and the other of said support arms and the corresponding side air nozzle housing being pivotally mounted upon a vertical axis to accommodate vehicles of different widths.

32. In the apparatus of claim 31, the pivotal mounting of said other support arm being upon a vertical axis;

the mount flange for said other pivotal support arm being pivotally mounted upon the other end of said arm upon a second vertical axis;

whereby said preselected acute angle of said orifices can be maintained despite pivotal movements of its corresponding side air nozzle housing.

33. In the apparatus of claim 28, and remote-controlled power means upon said framework connected to said other pivotal support arm and to said pivot mount flange for pivoting said support arm and said mount flange relative to said pivot arm for determining the position of the corresponding nozzle housing relative to the width of the vehicle.

34. In the apparatus of claim 33, said remote-controlled power means including a transverse control arm pivotally connected to said other pivoted support arm at its outer end and connected to said pivotal mount flange;

a fluid cylinder pivotally mounted upon said framework having a reciprocal piston rod connected to said control arm; and a tie bar parallel to said support arm at its ends pivotally connected to said framework and to said mount flange for maintaining said orifice angle during pivotal movements of the corresponding pivotal side nozzle support arm.

35. In the apparatus of claim 34, and a sonar assembly mounted upon said pivotal side nozzle housing and facing the side of a vehicle passing through said framework, said sonar assembly controlling reciprocal movements of said piston rod for determining the spaced relation between said pivotal side nozzle housing and vehicle.

36. In the apparatus of claim 8, said top nozzle housing having said spaced sidewalls diverging and further including a rear wall, an outwardly diverging front wall portion inclined away from said rear wall terminating in an inwardly converging front wall inclined toward said rear wall and further defining said air chamber.

37. In the apparatus of claim 1, each of said motor operated blowers including an electric motor having a drive shaft mounted upon said framework adapted to drive an impeller; and a unit blower housing of molded plastic material including said air outlet which is tangential to and a unit part of said blower housing, one side of said housing receiving said drive shaft and being secured to and mounted upon said motor.

38. In the apparatus of claim 37, further comprising a screened air inlet cone mounted upon the other side wall of said unit blower housing.

39. In the apparatus of claim 1, further comprising control means for said power means mounted upon said lift rod.

40. In the apparatus of claim 39, said control means being a plurality of electric eyes beamed transversely of vehicle movement.

41. In the apparatus of claim 39, said control means being a sonar device facing said vehicle.

42. In the apparatus of claim 8, each of said motor operated blowers including an electric motor having a drive shaft mounted upon said framework adapted to drive an impeller; and a unit blower housing of molded plastic material including said air outlet which is tangential to and a unit formed part of said blower housing, one side wall of said housing receiving said drive shaft and being secured to and mounted upon said motor.

43. In the apparatus of claim 8, and control means for said power means mounted upon said lift rod.

44. In the apparatus of claim 16, said electronic means including a plurality of electric eyes beamed transversely of said vehicle movement.

45. In the apparatus of claim 16, said electronic means including a sonar device mounted upon said top nozzle facing said vehicle.

46. In the apparatus of claim 8, said remote controlled power means including retractable lift cables guidably mounted upon said framework and at their one ends connected to said lift rods;

a platform upon said framework centrally of and arranged along said axis;

a pair of coaxial first idler pulleys upon said platform receiving said cables respectively;

an apertured cable anchor plate upon said platform receiving said cables;

a cylinder-operated carriage reciprocally mounted upon said platform; and a pair of coaxial second idler pulleys journaled upon said carriage respectively receiving said cables, with end portions of said cables extending from said second idler pulleys and secured to said anchor plate;

whereby retraction of said carriage simultaneously retracts said cables lifting said top nozzle housing, and movement in the opposite direction permits simultaneous extension of said cables, lowering said top nozzle housing.

47. In an apparatus for treating vehicles, a framework upon a floor surface having an axis adapted to receive a vehicle moving along said axis;

a transverse lift rod at its ends guidably mounted upon said framework for controlled vertical adjustments;

fluid means connected to and depending from said lift rod for directing a fluid towards the vehicle moving through said framework;

remote-controlled power means upon said framework including retractable lift cables depending from said framework and connected to said lift rod for raising and lowering said fluid means;

a platform upon said framework centrally of and arranged along said axis;

a pair of coaxial first idler pulleys upon said platform receiving said cables respectively;

an apertured cable anchor plate upon said platform receiving said cables;

a cylinder-operated carriage reciprocally mounted upon said platform; and a pair of coaxial second idler pulleys journaled upon said carriage respectively receiving said cables, with end portion of said cables extending from said second idler pulleys and secured to said anchor plate;

whereby movement of said carriage in one direction simultaneously retracts said cables lifting said fluid means, and movement of said carriage in the opposite direction permits simultaneous extension of said cables, lowering said fluid means.

48. In the apparatus of claim 47, said power means for raising and lowering said lift rod including a pair of upright laterally spaced opposed guide rods upon said framework;

opposed upright roller housings journaling rollers in snug guided registry with said guide rods and having opposed inwardly directed sleeves supportably receiving opposite ends of said lift rod;

said power-operated retractable lift cables depending from said frame and being connected to said roller housings respectively.

49. In the apparatus of claim 48, said lift rod being rotatably and angularly adjustable with said opposed sleeves; and clamp means interposed between one of said roller housing sleeves and said lift rod for securing the lift rod in adjusted position for determining the inclination of said fluid means relative to a vehicle passing thereunder.

50. In the apparatus of claim 49, said clamp means including a first clamp secured upon said one roller housing sleeve;

a second clamp rotatably mounted upon said lift rod for interlock with said first clamp; and fastening means for securing said first clamp in adjusted position upon said roller housing sleeve.

51. In the apparatus of claim 48, said power means further including a pair of laterally spaced pulley supports upon said framework overlying said roller housings, said pulley supports journaling pulleys respectively receiving said lift cables;

the connection of said cables to said roller housings including an upright clevis upon each roller housing; and an eyelet upon the end of each cable nested and retained within each clevis;

engagement of each clevis with said pulley supports limiting retracting movements of said cables.

52. In the apparatus of claim 48, said power means including a pair of laterally spaced opposed pulleys supported upon said framework overlying and receiving said cables respectively.

53. In the apparatus of claim 47, a roller support upon one end of said carriage; and a pair of rollers journaled upon said roller support mounted upon said platform.

54. In the apparatus of claim 47, a fluid cylinder mounted upon said platform having a reciprocal piston rod aligned with and connected to said carriage; and remote-controlled electronic means for selectively activating said fluid cylinder for successively raising and lowering said fluid means relative to a vehicle moving through the framework.

55. An apparatus for drying vehicles, comprising a framework upon a floor surface having an axis adapted to receive a vehicle moving along said axis;

a transverse lift rod having ends which are mounted upon said framework for providing controlled vertical adjustments of said lift rod;

a transverse top nozzle housing connected to and depending from said lift rod for controlled vertical adjustments thereof;

means for mounting said top nozzle housing on said lift rod for rotational movement, said top nozzle housing when accidentally struck by a vehicle moving through said framework rotating and thereby swinging out of the path of the vehicle as it moves along the axis;

said top nozzle housing having an air inlet at its top communicating with an air chamber and downwardly extending laterally spaced sidewalls terminating in an elongated throated, downwardly opening air outlet communicating with said air chamber;

a pair of opposed elongated upright side air nozzle housings mounted upon opposites sides of said framework, each side air nozzle housing having an air inlet at its upper end, an elongated air chamber communicating with said air inlet and an elongated lateral nozzle including a series of vertically aligned orifices extending approximately the height of a vehicle, and inclined rearwardly at an acute angle toward the vehicle;

a plurality of motor-operated air blowers mounted upon said framework with each blower having an air outlet;

a plurality of flexible hoses interconnecting the air outlet of each blower with one of the housing air inlets respectively;

remote-controlled power means upon said framework connected to said lift rod for successively vertically raising and lowering said top nozzle housing to normally prevent contact with a vehicle moving through said framework;

said power means for raising and lowering said lift rod including a pair of upright laterally spaced opposed guide rods upon said framework;

opposed upright roller housing journaling rollers in snug guided registry with said guide rods and having opposed inwardly directed sleeves which supportable receive opposite ends of said lift rod; and power-operated retractable lift cables depending from said frame and connected to said roller housings respectively.

* * * * *